US011009464B2

(12) United States Patent
Hu et al.

(10) Patent No.: US 11,009,464 B2
(45) Date of Patent: May 18, 2021

(54) SMARTPHONE COMPATIBLE ON-CHIP BIODETECTION USING INTEGRATED OPTICAL COMPONENT AND MICROFLUIDIC CHANNEL WITH NANOPILLAR ARRAY

(71) Applicant: International Business Machines Corporation, Armonk, NY (US)

(72) Inventors: Huan Hu, Yorktown Heights, NY (US);
Oki Gunawan, Westwood, NJ (US);
Ning Li, White Plains, NY (US);
Devendra K. Sadana, Pleasantville, NY (US); Joshua T. Smith, Croton-on-Hudson, NY (US); William T. Spratt, Ossining, NY (US); Yann Astier, Livermore, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/965,948

(22) Filed: Dec. 11, 2015

(65) Prior Publication Data

US 2017/0167981 A1 Jun. 15, 2017

(51) Int. Cl.
*G01N 21/64* (2006.01)
*G01N 15/14* (2006.01)
(Continued)

(52) U.S. Cl.
CPC .... *G01N 21/6486* (2013.01); *B01L 3/502753* (2013.01); *G01N 15/0255* (2013.01);
(Continued)

(58) Field of Classification Search
CPC .......... G01N 21/64; G01N 15/14; C12Q 1/04; B01L 3/00
(Continued)

(56) References Cited

U.S. PATENT DOCUMENTS 8,947,656 B2    2/2015  Cunningham
2003/0092034 A1*  5/2003  Cooper ................. B01L 3/5027
                                                                 435/6.19
(Continued)

FOREIGN PATENT DOCUMENTS

WO    2014/078790 A1    5/2014
WO    2015/132347 A1    9/2015

OTHER PUBLICATIONS

Huang, R. et al, Prenatal Diagnosis 2008, 28, 892-899.*
(Continued)

*Primary Examiner* — Arlen Soderquist
(74) *Attorney, Agent, or Firm* — Harrington & Smith

(57) ABSTRACT

Methods, apparatuses, and computer program products are provided where fluid, such as a blood sample, is entered into a microfluidic channel in a microchip where the microfluidic channel possesses a micro/nanopillar array for sorting molecules by size. When the fluid passes through the micro/nanopillar array it is separated into particles of interest or particles not of interest or both. When particles of interest are lit by a light source via a first waveguide in the microchip connecting the light source to the microfluidic channel, then lighted particles of interest can be detected by an optical detector via a second waveguide in the microchip connecting the optical detector to the microfluidic channel. The information from the optical detector can be analyzed further by connecting the microchip to a mobile computing device with its own processing abilities or abilities via the internet or cloud.

23 Claims, 10 Drawing Sheets

(51) Int. Cl.
| | |
|---|---|
| *C12Q 1/04* | (2006.01) |
| *B01L 3/00* | (2006.01) |
| *G01N 15/02* | (2006.01) |
| *G01N 21/05* | (2006.01) |
| *G01N 15/00* | (2006.01) |
| *G01N 21/03* | (2006.01) |
| *G01N 15/10* | (2006.01) |

(52) U.S. Cl.
CPC ..... *G01N 15/1429* (2013.01); *G01N 15/1436* (2013.01); *G01N 15/1484* (2013.01); *G01N 21/645* (2013.01); *B01L 2200/0652* (2013.01); *B01L 2200/10* (2013.01); *B01L 2300/0627* (2013.01); *B01L 2300/0654* (2013.01); *B01L 2300/0864* (2013.01); *B01L 2400/086* (2013.01); *G01N 21/05* (2013.01); *G01N 2015/0038* (2013.01); *G01N 2015/0065* (2013.01); *G01N 2015/035* (2013.01); *G01N 2015/1081* (2013.01); *G01N 2021/0346* (2013.01); *G01N 2201/024* (2013.01); *G01N 2201/062* (2013.01); *G01N 2201/06113* (2013.01)

(58) Field of Classification Search
USPC ................. 422/82.08, 502; 436/63, 172, 165
See application file for complete search history.

(56) References Cited

U.S. PATENT DOCUMENTS

| | | | |
|---|---|---|---|
| 2005/0042766 A1* | 2/2005 | Ohman | B01L 3/50273 436/174 |
| 2007/0240495 A1* | 10/2007 | Hirahara | B01L 3/502746 73/53.01 |
| 2008/0003142 A1* | 1/2008 | Link | B01F 3/0807 422/82.08 |
| 2008/0014589 A1* | 1/2008 | Link | B01F 3/0807 435/287.2 |
| 2008/0023399 A1* | 1/2008 | Inglis | B01L 3/502753 210/649 |
| 2008/0113358 A1* | 5/2008 | Kapur | G01N 33/689 435/6.12 |
| 2009/0014360 A1* | 1/2009 | Toner | B01D 21/0087 209/208 |
| 2014/0134712 A1 | 5/2014 | Na et al. | |
| 2014/0246321 A1* | 9/2014 | Tsukada | B03C 5/026 204/601 |
| 2014/0312247 A1 | 10/2014 | McKee et al. | |
| 2015/0064153 A1* | 3/2015 | Civin | C12N 5/0647 424/93.71 |
| 2015/0104860 A1 | 4/2015 | Cunningham | |
| 2015/0244852 A1 | 8/2015 | Erickson et al. | |
| 2015/0253321 A1 | 9/2015 | Chou et al. | |
| 2016/0047735 A1* | 2/2016 | Grisham | G01N 15/1484 435/7.1 |
| 2016/0144405 A1* | 5/2016 | Astier | B07B 13/04 209/235 |
| 2016/0146778 A1* | 5/2016 | Astier | G01N 15/1031 506/12 |

OTHER PUBLICATIONS

Holm, S. H. et al, Lab-on-a-Chip 2011, 11, 1326-1332.*
Zhu, H. et al, Analytical Chemistry 2011, 83, 6641-6647.*
Ruano, J. M. et al, Analytical Chemistry 2000, 72, 1093-1097.*
MacDonald, M. P. et al, Nature 2003, 426, 421-424.*
Tung, T.-C. et al, Sensors and Actuators B 2004, 98, 356-367.*
Leeds, A. R. et al, Sensors and Actuators A 2004, 115, 571-580.*
Lien, V. et al, IEEE Journal of Selected Topics in Quantum Electronics 2005, 11, 827-834.*
Barber, J. P. et al, SPIE 2006, 6110, paper 61100H, 11 pages.*
Bernini, R. et al, Analytical and Bioanalytical Chemistry 2006, 386, 1267-1272.*
Li, N. et al, Proceedings of te 2nd IEEE International Conference on Nano/amicro Engineered and Molecular Systems 2007, 932-936.*
Hawkins, A. R. et al, SPIE 2007, 6462, paper 64620U, 12 pages.*
Yin, D. et al, Lab on a Chip 2007, 7, 1171-1175.*
Bliss, C. L. et al, Lab on a Chip 2007, 7, 1280-1287.*
Cleary, A. et al, Applied Physics Letters 2007, 91, paper 071123, 3 pages.*
Godin, J. et al, Journal of Biophotonics 2008, 1, 355-376.*
Barat, D. et al, Optics Communications 2010, 283, 1987-1992.*
Cho, S. H. et al, Lab on a Chip 2010, 10, 1567-1573.*
Loutherback, K. et al, Microfluidics and Nanofluidics 2010, 9, 1143+1149.*
Wu, H.-W. Biomicrofluidics 2010, 4, paper 024112 12 pages.*
Godin, J. et al, Biomedical Optics Express 2010, 1, 1472-1479.*
Measor, P. et al, Lab on a Chip 2011, 11, 899-904.*
Joensson, H. N. et al, Lab on a Chip2011, 11, 1305-1310.*
Inglis, D. W. et al, Journal of Micromechanics and Microengineering 2011, 21, paper 054024, 8 pages.*
Beech, J. P. et al, Lab on a Chip 2012, 12, 1048-1051.*
Zhu, H. et al, Analyst 2012, 137, 2541-2544.*
Schiro, P. G. et al, Angew.andte Chemie International Edition 2012, 51, 4618-4622.*
Chung, J. et al, Advanced Healthcare Materials 2012, 1, 432-436.*
Loutherback, K. et al, AIP Advances 2012, 2, paper 042107, 7 pages.*
Liu, Z. et al, Biomicrofluidics 2013, 7, paper 011801, 10 pages.*
Ozkumur, E. et al, Science Translational Medicine 2013, 5, paper 179ra47, 11 pages and 29 pages of supplementary materials.*
Zhu, H. et al, Journal of Visualized Experiments 2013, paper e50451, 5 pages.*
Yu, L. et al, Lab on a Chip 2013, 13, 3163-3182.*
Geng, Z. et al, RSC Advances 2013, 3, 14798-14806.*
Zhao, M. et al, Methods 2013, 64, 108+113 and 4 pages of supplementary materials.*
Parks, J. W. et al, Lab on a Chip 2013, 13, 4118-4123.*
Zhao, M. et al, Analytical Chemistry 2013, 85, 9671-9677.*
Jing, T. et al, 17th International Conference on Miniaturized Systems for Chemistry and Life Sciences 2013,1373-1375.*
Chen, Y. et al, Lab on a Chip 2014, 14, 626-645.*
Huang, N.-T. et al, Lab on a Chip 2014, 14, 1230-1245.*
Karabacak, N. M. et al, Nature Protocols 2014, 9, 694-710.*
Ranjan, S. et al, Lab on a Chip 2014, 14, 4250-4262.*
Parks, J. W. et al, Biomicrofluidics 2014, 8, paper 054111, 8 pages.*
Holmes, D. et al, Interface Ffocus 2014, 4, paper 20140011, 9 pages.*
Okano, H. et al, Biomedical Microdevices 2015, 17, paper 59, 11 pages.*
Kobering, F. et al, SPIE 2003, 5143, 181-192.*
Fu, J. et al, Nature Nanotechnology 2007, 2, 121-128.*
Beech, J. P. et al, Lab on a Chip 2008, 8, 657-659.*
Jiang, J. et al, Sensors and Actuators B 2014, 193, 653-659.*
Li, B. et al, Lab on a Chip 2014, 14, 4085-4092.*
Wang, C. et al, ACS Nano 2015, 9, 1206-1218.*
Huang, L. R. et al, Science 2004, 304, 987-990 and 2 pages of supplimentary material.*
Holm, S. H. et al, Lab on a Chip 2011, 11, 1326-1332 and 8 pages of electronic supporting information.*
Wendt, J. R. et al, Journal of Vacuum Science and Technology B 1999, 17, 3252-3255.*
Uchiyama, K. et al, Fresenius Journal of Analytical Chemistry 2001, 371, 209-211.*
Qiao, H. et al, SPIE 2003, 5062, 873-878.*
Chediak, J. A. et al, Sensors and Actuators A 2004, 111, 1-7.*
Misiakos, K. et al, Analytical Chemistry 2004, 76, 1366-1373.*
Balslev, S. et al, 17th IEEE International Conference on Micro Electro Mechanical Systems. Maastricht MEMS 2004 Technical Digest 2004, 89-92.*
Kedia, S. et al, SPIE 2005, 5649, 241-252.*
Miyaki, K. et al, Analytical and Bioanalytical Chemistry 2005, 382, 810-816.*
Yao, B. et al, Lab on a Chip 2005, 5, 1041-1047.*

(56) References Cited

OTHER PUBLICATIONS

Farmer, A. S. et al, Review of Scientific Instruments 2005, 76, paper 115102, 5 pages.*
Balslev, S. et al, Lab on a Chip 2006, 6, 213-217.*
Kim, Y.-H. et al, Journal of Microelectromechanical Systems 2006, 15, 1152-1158.*
Li, Z. et al, IEEE Journal of Selected Topics in Quantum Mechanics 2007, 13, 185-193.*
Smith, M. C. et al, Analytica Chimica Acta 2007. 598, 286-294.*
Hawkins, A. R. et al, Microfluidis and Nanofluidics 2008, 4, 17-32.*
Bliss, C. L. et al, Lab on a Chip 2008, 8, 143-151.*
Kimura, H. et al, Lab on a Chip 2008, 8, 741-746.*
Pais, A. et al, Lab on a Chip 2008, 8, 794-800.*
Ren, K. et al, Lab on a Chip 2009, 9, 733-736.*
Mappes, T. et al, Microelectronic Engineering 2009, 86, 1499-1501.*
Mappes, T. et al, SPIE 2009, 7418, paper 74180A, 8 pages.*
Beech, J. P. et al, Thirteenth International Conference on Miniaturized Systems for Chemistry and Life Sciences 2009, 785-787.*
Banerjee, A. et al, Journal of Luminescence 2010, 130, 1095-1100.*
Mappes, T. et al, SPIE 2010, 7716, paper 77160R, 10 pages.*
Ashok, P. C. et al, Lab on a Chip 2011, 11, 1262-1270.*
Vannahme, C. et al, Optics Express 2011, 19, 8179-8186.*
Xue, S. et al, Journal of Environmental Sciences 2012, 24, 564-570.*
Hu, Z. et al, Lab on a Chip 2012, 12, 2850-2857.*
Holm, S. H. et al, 16th International Conference on Miniaturized Systems for Chemistry and Life Sciences 2012, 530-532.*
Ogudo, K. A. et al, Journal of Micro/Nanolithogrsthy, MEMS, and MOEMS 2013, 12, paper 013015, 13 pages.*
Williams, G. et al, Electronics 2014, 3, 43-75.*
Laki, A. J. et al, The 9th IEEE International Conference on Nano/Micro Engineered and Molecular Systems (NEMS) 2014, 490-493.*
Lee, H. et al, Sensors 2014, 14, 17008-17036.*
Lismont, M. et al, Applied Physics Letters 2014, 105, paper 133701, 4 pages.*
Holt, J., et al, MRS Proceedings 2014, 1686, Mrss14-1686-v09-02, 6 pages.*
Laki, A. J. et al, BioNanoScience 2015, 5, 48-54.*
Vaculovicova, M. et al, Analytica Chimica Acta 2015, 871, 85-92.*
Liu, Y. et al, Scientific Reports 2015, 5, paper 12864, 9 pages.*
Huang, Lotien Richard, et al., "Continuous Particle Separation Through Deterministic Lateral Displacement", Science vol. 304, May 14, 2004, pp. 987-990.
Davis, John A., et al., "Deterministic hydrodynamics: Taking blood apart", PNAS, vol. 103, No. 40, Oct. 3, 2006, pp. 14779-14784.
Morton, Keith J., et al., "Hydrodynamic metamaterials: Microfabricated arrays to steer, refract, and focus streams of biomaterials", PNAS; vol. 105, No. 21, May 27, 2008, 8 pgs.

* cited by examiner

US 11,009,464 B2

SMARTPHONE COMPATIBLE ON-CHIP BIODETECTION USING INTEGRATED OPTICAL COMPONENT AND MICROFLUIDIC CHANNEL WITH NANOPILLAR ARRAY

TECHNICAL FIELD

This invention relates generally to detection of molecules using a chip which can sort the molecules via a nanopillar array within a microfluidic channel, which can identify molecules of interest with an integrated optical component, and which can connect to a computer, such as a smartphone, capable of processing the information.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Investigating the constituents of chemical and/or biological samples typically requires advanced machinery to separate the samples into component parts so as to identify them. For example, investigating blood plasma can require drawing a quantity of blood and then having the blood transported to a laboratory where an operation such as centrifuge separation is done to distinguish the components present therein. Such laboratory work can be a time-consuming process. Time delays also are incurred by transporting the sample to the laboratory and reporting back to the medical professional who ordered the blood test and back to the patient. Even for simple chemical separation, similar laboratory and reporting delays may be present as well as the requirement for large-scale laboratory equipment.

Abbreviations that may be found in the specification and/or the drawing figures are defined in the text.

BRIEF SUMMARY

This section is intended to include examples and is not intended to be limiting.

Various aspects of examples of the invention are set out in the claims.

According to a first aspect of the present invention, a method comprises inputting a fluid into a microchip via a microfluidic channel with a micro/nanopillar array for sorting molecules by size, in response to the fluid passing through the micro/nanopillar array separating the fluid into the particles of interest or particles not of interest or both; lighting the particles of interest by a light source via a first waveguide in the microchip connecting the light source to the microfluidic channel; and detecting lighted particles of interest by an optical detector via a second waveguide in the microchip connecting the optical detector to the microfluidic channel.

According to a second aspect of the present invention; an apparatus comprises a microchip comprising at least one microfluidic channel with at least one micro/nanopillar array for sorting molecules by size, wherein a fluid input into the at least one microfluidic channel can be separated into at least one group of particles of interest or at least one group of particles not of interest, or both at least one group of particles of interest and at least one group of particles not of interest; at least one light source for lighting the at least one group of particles of interest via at least one first waveguide in the microchip connecting the at least one light source to the at least one microfluidic channel; and at least one optical detector for detecting lighted at least one group of particles of interest via at least one second waveguide in the microchip connecting the at least one optical detector to the at least one microfluidic channel.

According to a third aspect of the present invention, a computer program product, which is embodied on a non-transitory computer-readable medium in which a computer program is stored, such that when the program is executed by a computer it is configured to provide instructions to control or carry out analyzing an electronic signal from a microchip configured to produce an electronic signal from an optical signal wherein that optical signal is a result of detecting lighted particles of interest by an optical detector via a second waveguide in the microchip connecting the optical detector to a microfluidic channel in the microchip after particles of interest were lighted by a light source via a first waveguide in the microchip connecting the light source to the microfluidic channel, as a result of fluid inputted into a microchip via a microfluidic channel with a micro/nanopillar array for sorting molecules by size, wherein in response to the fluid passing through the micro/nanopillar array, the fluid separates into the particles of interest or particles not of interest or both.

DETAILED DESCRIPTION OF THE DRAWINGS

Figure 1:
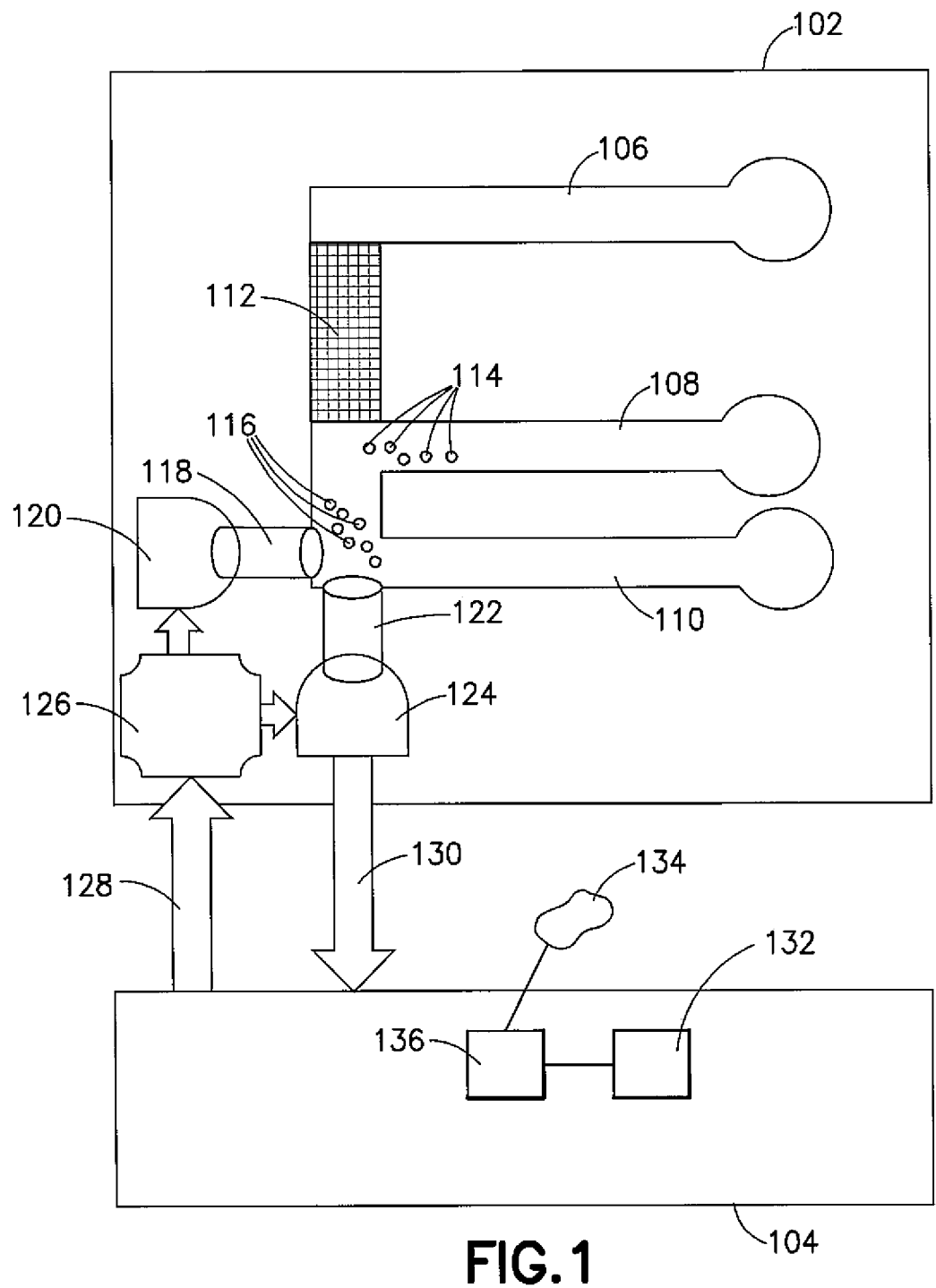
FIG. 1 is a block diagram of one possible and nonlimiting exemplary system in which the exemplary embodiments may be practiced.

In order to overcome some of the disadvantages of the current state of affairs as described above, exemplary embodiments of the current invention look to use on-chip biodetection. In a sense, this on-chip biodetection could be understood as having a mini laboratory on a microchip. Exemplary embodiments of the current invention use integrated optical component combined with microfluidic channels employing a nanopillar array for separating out the various chemical or biological components and can be compatible with smartphones or other devices that could link to the cloud.

The word "exemplary" as used herein means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Therefore, the exemplary embodiments herein describe techniques for smart phone compatible on-chip biodetection using an integrated optical component and microfluidic channel with a nanopillar array. Additional description of these techniques is presented after a system into which the exemplary embodiments may be used is described.

Without in any way limiting the scope, interpretation, or application of the claims appearing below, an advantage or technical effect of one or more of the example embodiments disclosed herein is integrating an optical sensing capability with the sorting capability of micro/nanopillars to achieve an on-chip biosensing. Another technical effect of one or more of the example of embodiments disclosed herein is combining the on-chip sorting and sensing capabilities with the computing power of a smartphone for processing the information and providing read-out functionality. Another technical effect of one or more of the example of embodiments disclosed herein is that this invention provides a solution for people to perform biological testing using their own smart phone, a lower cost of diagnosis, and a reduction in the detection time.

As a nonlimiting example, a person interested in determining whether his or her blood plasma contains a particular marker of a disease or condition can use this invention to determine if biomolecules would be present in his or her blood plasma by applying small quantity of their blood plasma to the openings in an integrated chip that has microfluidic channels. The fluid is treated with a chemical that will fluoresce the intended subject of the investigation. Fluid flows in the opening of the microfluidic channel and passes through a nanopillar array which separates the molecules by size. Once the molecules are separated the molecules of interest go down one microfluidic channel, while the molecules not of interest go down another microfluidic channel. The molecules of interest pass in front of an optical waveguide which transmits light through it whereby it fluoresces the molecules of interest. At a right angle to the light transmitting waveguide is a waveguide that leads back to an optical sensor which detects the fluoresced molecules. The optical signal is then changed into an electronic signal which can be passed to a smart phone for data processing and displaying the result of the investigation.

Specifically, silicon micro/nanopillars can separate biomolecules or nanoparticles based on their size, which allows sorting. After sorting particular biomolecules or nanoparticles, the result of that storing will be detected by an on-chip optical system.

An on-chip light source provides excitation light. On-chip optical waveguides lead the excitation light precisely to the sensing region in microfluidic channels and induce fluorescence light of biomolecules of interest.

The fluorescence light of biomolecules will be guided along another optical waveguide to an on-chip light detector.

The on-chip light detector will pass the signal to smartphone, or some similarly situated device, for signal processing, data display, and data analysis.

Silicon technology allows integrating optical waveguides, light source, and light detectors on chip. Moreover, the source light used can be any light source that emits the appropriate wavelength of light whether that be a laser source or a simple, cheap Light Emitting Diode (LED)

Silicon nanopillars within microfluidic channel allow for biomolecular sorting.

Leveraging these two technologies can lead to a new portable platform for biosensing compatible with a smartphone.

Naturally, the discussion herein is merely an example of the use of embodiments taught by the claims of this invention. All manner of tests on differently sized molecules in a fluid form can be performed. Furthermore, different molecules of interest can be sorted through the micro/nanopillar array such that various microfluidic channels could be established for each of them has the right angle oriented optical waveguides for shining and detecting as described above.

Turning to FIG. 1, a block diagram representation is depicted of an example of a nonlimiting physical embodiment of a proposed silicon chip 102 and a smart phone (or other such similar device) 104.

Within the lab-on-a-chip 102, shown are three branches of microfluidic channel branches 106, 108, 110. The sample, be it for example blood plasma, some biological liquid, or some fluid chemical, is deposited into microfluidic channel branch 106 where it travels down until it meets the nanopillars 112 wherein the biomolecules are sorted.

The result of this sorting produces unsorted biomolecules 114 and the sorted biomolecules 116. Sorted biomolecules 116 pass in front of optical waveguide 118 which is a waveguide for transmitting the light source which originates from on-chip light source 120. The light from the on-chip light source 120 passes through optical waveguide 118 and streams light across sorted biomolecules 116 which fluoresces, and is the biomolecules of interest.

These sorted biomolecules 116, which have been excited by the on-chip light source 120 via waveguide 118, then emit fluorescence light in front of waveguide 122 wherein the fluorescent light from the biomolecules 116 is detected by the on-chip light detector 124.

The unsorted biomolecules exit the chip via microfluidic channel branch 108, whereas the sorted biomolecules exit the chip via microfluidic channel branch 110. These bio fluidic channels do not need a power source. However, on-chip light source 120 and the on-chip light detector 124 would need some power source, either an on-chip power source 126 or a power source which derives its energy from an external connection such as smart phone 104. The connection to such power source is indicated by connection 128.

The on-chip light detector 124 will send its signal to smartphone 104 via connection 130. The signal from on-chip light detector 124 is converted from an optical signal to an electrical signal and possibly to a digital signal prior to its being sent to smart phone 104 or through connection 130 itself.

Note that connection 128 and connection 130 may be done in the same physical wired embodiment, via separate connections, or some combination thereof. Moreover connection 128 and connection 130 could also be done wirelessly, if wireless power transmission is available for connection 128, and if wireless connection such as Bluetooth, Wi-Fi, or some other wireless connection is available. For these various types of connections, wires, antennas, and/or additional functionality may be required to effectuate such connection. Additionally, connection 128 could also change alternating current (AC) power to direct current (DC) power if such a change of power is necessary for the functioning of internal power source 126.

Smart phone 104 will either have the processing power itself with sufficient processors, memory, and data in module 132 or will have some connection via radio waves, Wi-Fi, or some other connection (not shown) to the Internet, a cloud computing platform, or some similarly situated database that can be process the data remotely 134. Either way, using either internal processing via module 132 or external processing via cloud 134, the user interface will be through application 136 which is resident, at least in terms of its interface with the user, on smart phone 104.

In general, the various embodiments of the smart phone 104 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware using either internal processing via module 132 or external processing via cloud 134. In an exemplary embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium that may be any media or means that can contain, store, and/or transport the instructions for use by or in connection with an instruction execution system, apparatus, or device, such as a computer. A computer-readable storage medium does not comprise propagating signals.

Figure 2:
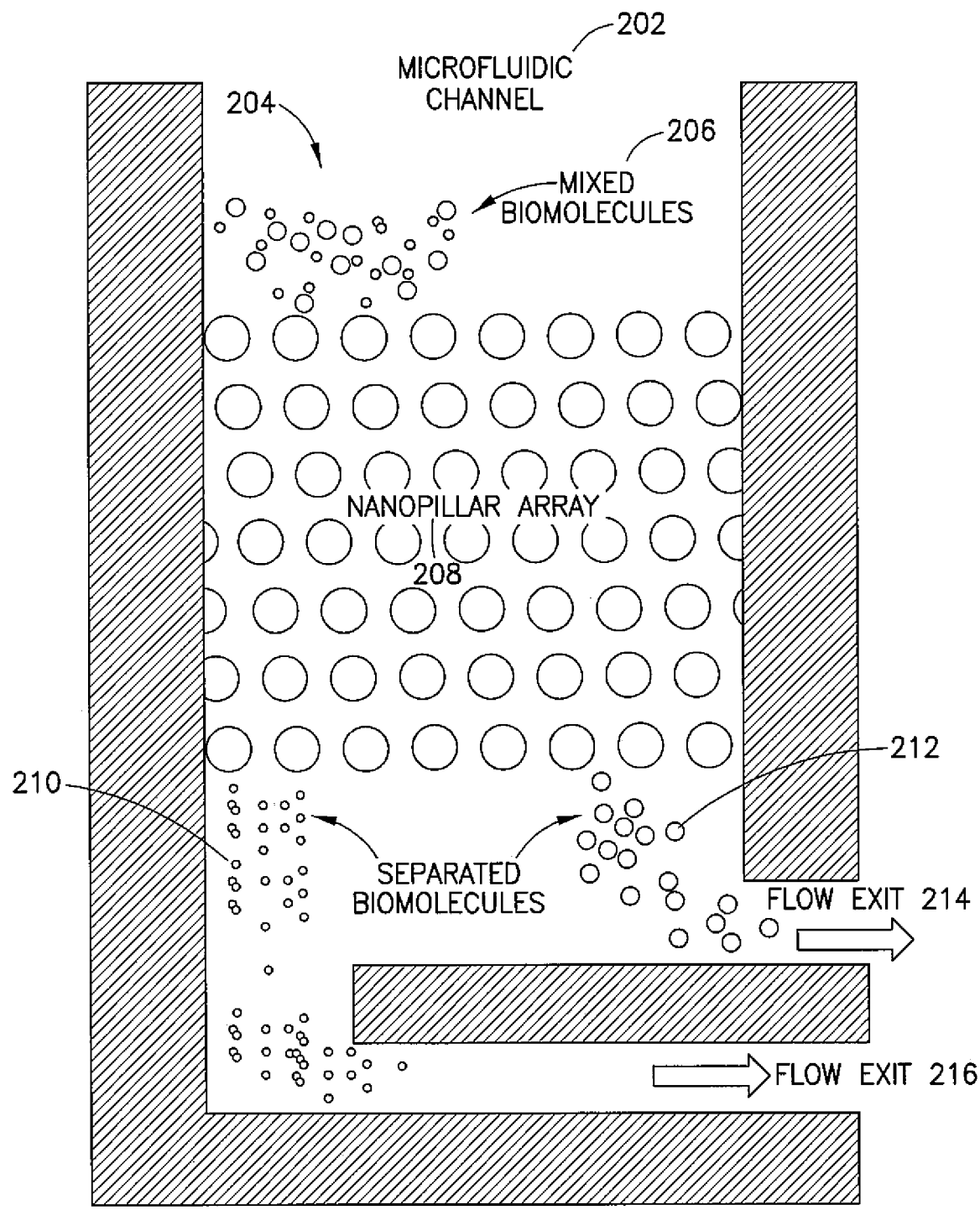
FIG. 2 is a block diagram of one possible and nonlimiting exemplary representation of the nanopillars within the microfluidic channels.

FIG. 2 is directed to a nonlimiting block diagram representation of the nanopillars within microfluidic chips. The entire micro fluidic channel 202 shows at the top an opening 204 wherein the mixed biomolecules that are to be separated are introduced. These mixed biomolecules 206 pass through the nanopillar array 208. After passing through the nanopillar array 208 the biomolecules 206 are separated into the biomolecules of interest to 210 and the biomolecules not of interest 212. The biomolecules not of interest 212 exit the microfluidic chamber at exit 214.

The separated biomolecules of interest 210 proceed to eventually flow through exit 216. Thus, comparing FIG. 1 to FIG. 2, the microfluidic channel 204 could be thought of as branch 106 and the separated flows exit 214 relates to branch 108 and exit 216 relates to branch 110.

Figure 3:
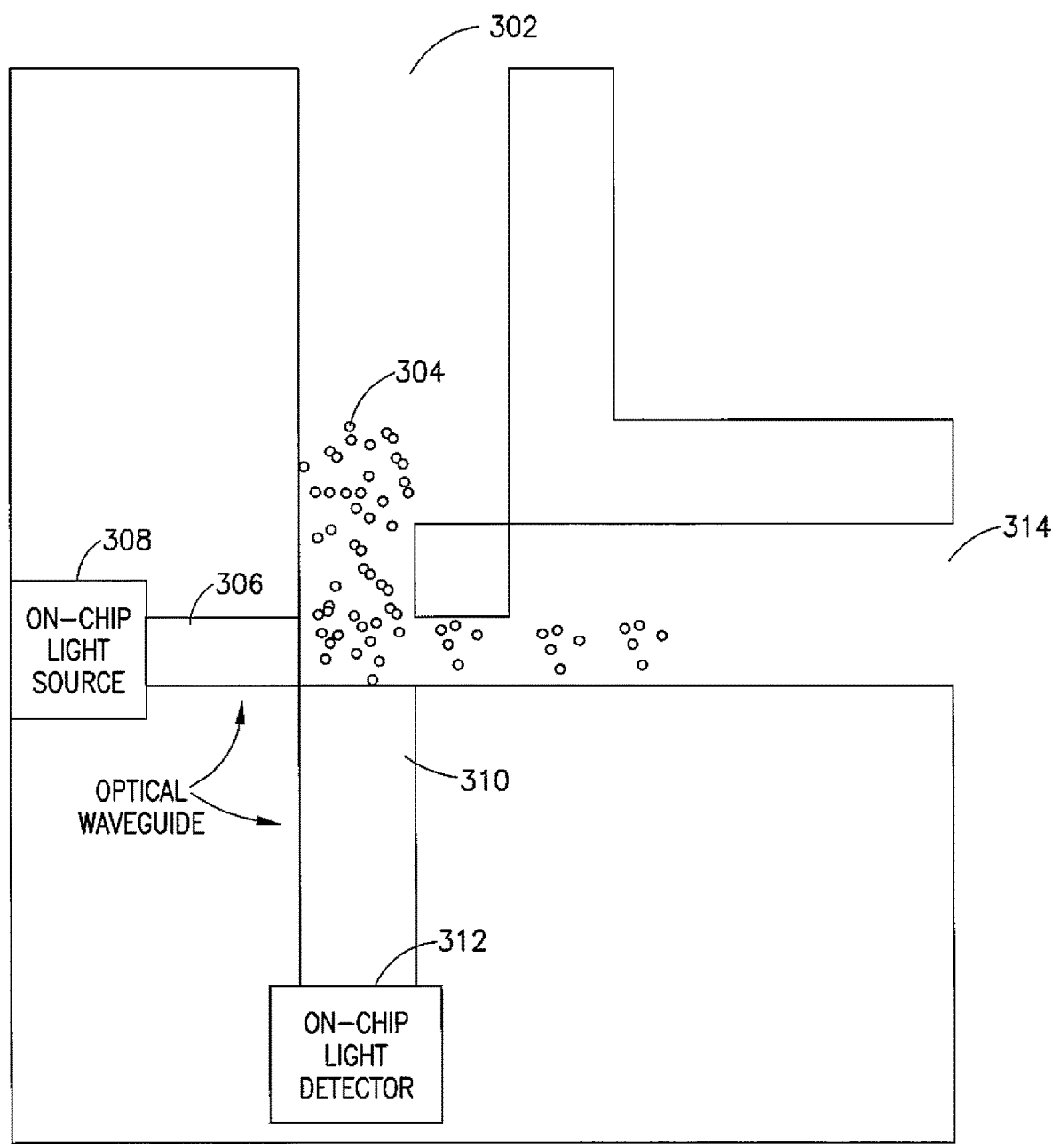
FIG. 3 is a block diagram of one possible and nonlimiting exemplary representation of the flow of biomolecules after passing through the nanopillar array.

FIG. 3 is a more detailed nonlimiting examination of the flow after passing through the nanopillar array 208 (or 112) whereby the separated biomolecules of interest 210 are passing through exit 216 (or branch 110). These biomolecules of interest 210 can also be seen in FIG. 1 as biomolecules 116.

Turning now to FIG. 3, which is a nonlimiting block diagram representation of the flow of the targeted biomolecules after leaving the nanopillar array 302, the targeted biomolecules 304 which have been previously had a fluorescing compounded administered to them, pass in front of optical waveguide 306 which carries the light from on-chip light source 308. While these targeted biomolecules 304 pass in front of waveguide 306 they also pass across the opening of waveguide 310, where optical waveguides 306 and 310 are at right angles to one another, thereby only those targeted biomolecules 304 which are illuminated from the light from light source 308 are detected by on-chip light detector 312 via waveguide. The waveguide are at 90 degree angle, so the incident light from waveguide 308 will not get into waveguide 310, only fluorescence light from molecules of interest will get into waveguide 310.

Thereafter, the targeted biomolecules 304 exit the microfluidic channel through exit 314, which would correspond to the flow exit 216 in FIG. 2. Also, thereafter, the on-chip light detector 312 will send its information to the smart phone (not shown).

Figure 4A:
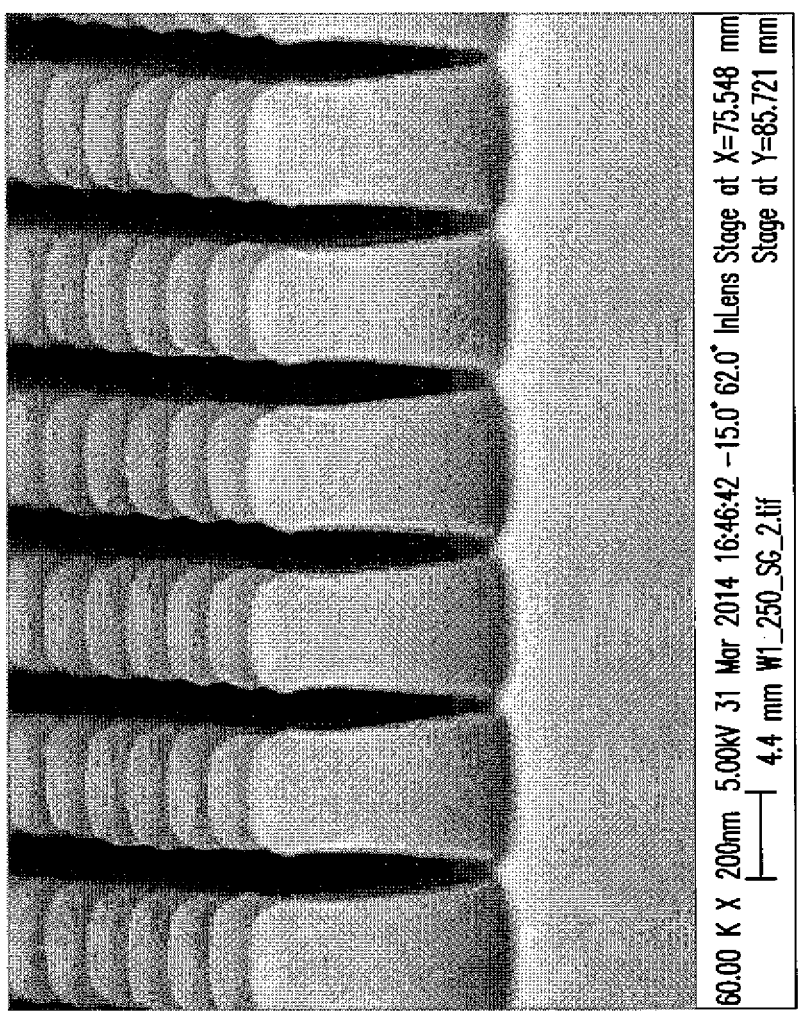
FIG. 4A and FIG. 4B illustrate nonlimiting exemplary embodiments of various nanopillar array embodiments.
Figure 4B:
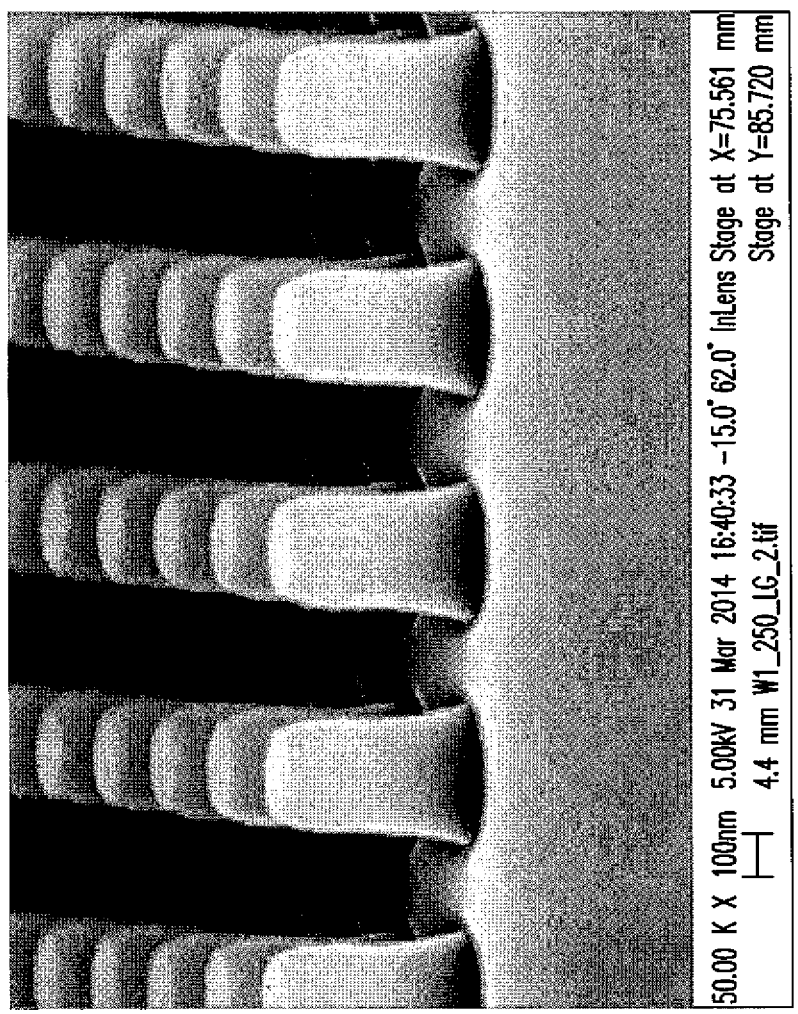

FIG. 4A and FIG. 4B illustrate exemplary embodiments of various nanopillar arrays. FIG. 4A shows a nanopillar array with gaps of 250 nm while FIG. 4B illustrates the nanopillar array with a Regime of less than 100 nm.

Figure 5:
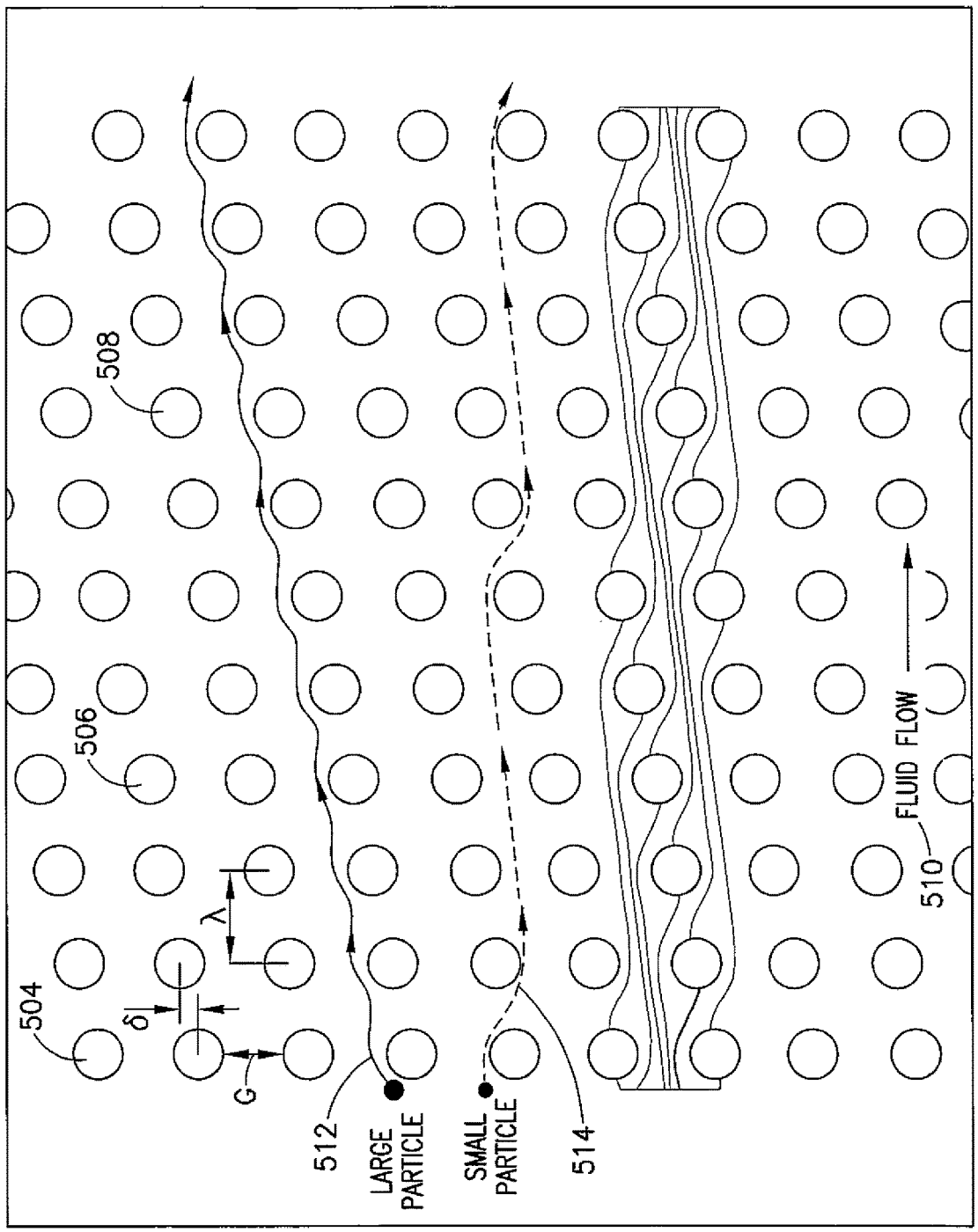
FIG. 5 is a nonlimiting illustration of how fluid flows through a nanopillar array.

FIG. 5 is a nonlimiting illustration of how the fluid flows through a nanopillar array. The nanopillar array contains various nanopillars shown by example as 504, 506, and 508. The flow of fluid generally is shown by the arrow 510. As a broad example, there can be various types of particles in a particular fluid and two tracks are shown in nanopillar array. First, flow 512 which would be illustrative of a large particle (large being a relative size that is larger than what will be described as the small particles all of these in the micrometer to the nanometer size frame) and flow 514 being that of the small particle size.

As can be seen from FIG. 5, in each row of the nanopillar array the placement of the nanopillars is slightly off from parallel or rather create a diagonal when looked at from the above. A nanopillar array is configured that each column of nanopillar array is shifted vertically by a certain distance, usually a fraction of the nanopillar pitch.

Thus, as can be seen the flows of the various sized particles move from one end of the nanopillar array to the other in different orientations. As such, they can be sorted into different sized particles.

Figure 6A:
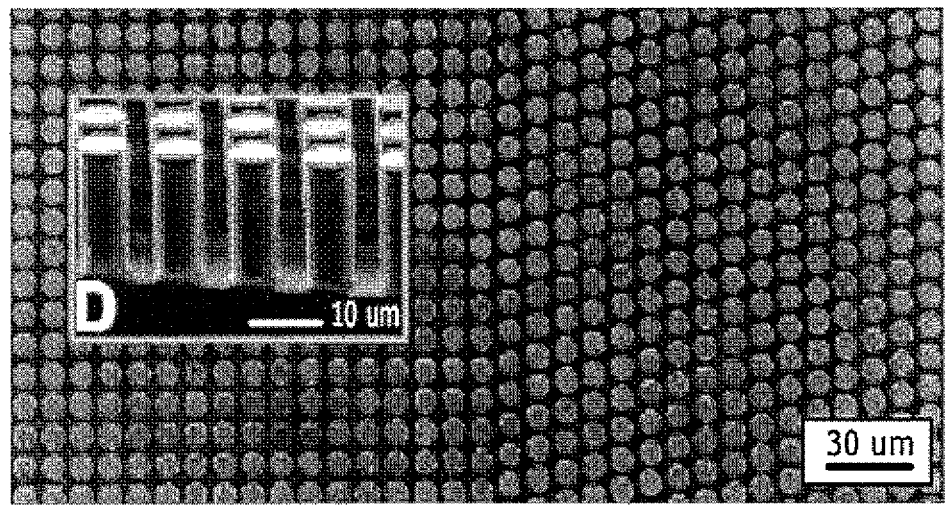
FIG. 6A is a nonlimiting illustration of a nanopillar array and FIG. 6B is a nonlimiting graphical representation of flows through a nanopillar array.
Figure 6B:
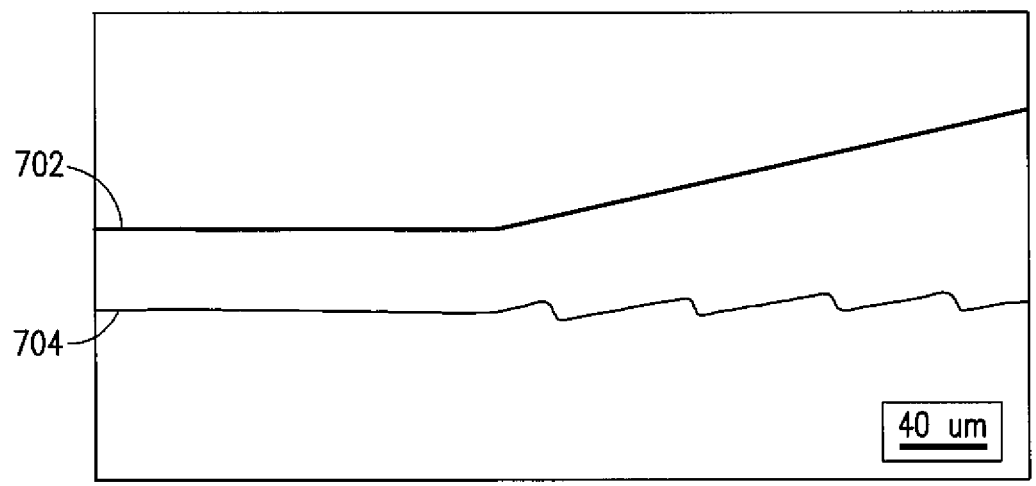

Turning to FIG. 6A, a nonlimiting representation of the nanopillars can be seen. In the left region, the nanopillars are arranged in a way that each column of nanopillar is not shifted vertically. The flow through this region is straight. In the right region, each column of nanopillar is shifted vertically up by a distance; this region can separate biomolecules by sizes. As shown in FIG. 6B, two different paths of flow are depicted.

FIG. 6B displays a nonlimiting graphical representation of the flows of the various sized particles where 702 represents the larger particles and 704 represents the smaller. A larger particle will move along the gaps of the nanopillars, while a smaller particle will follow a zig-zag path through the nanopillar array.

Figure 7A:
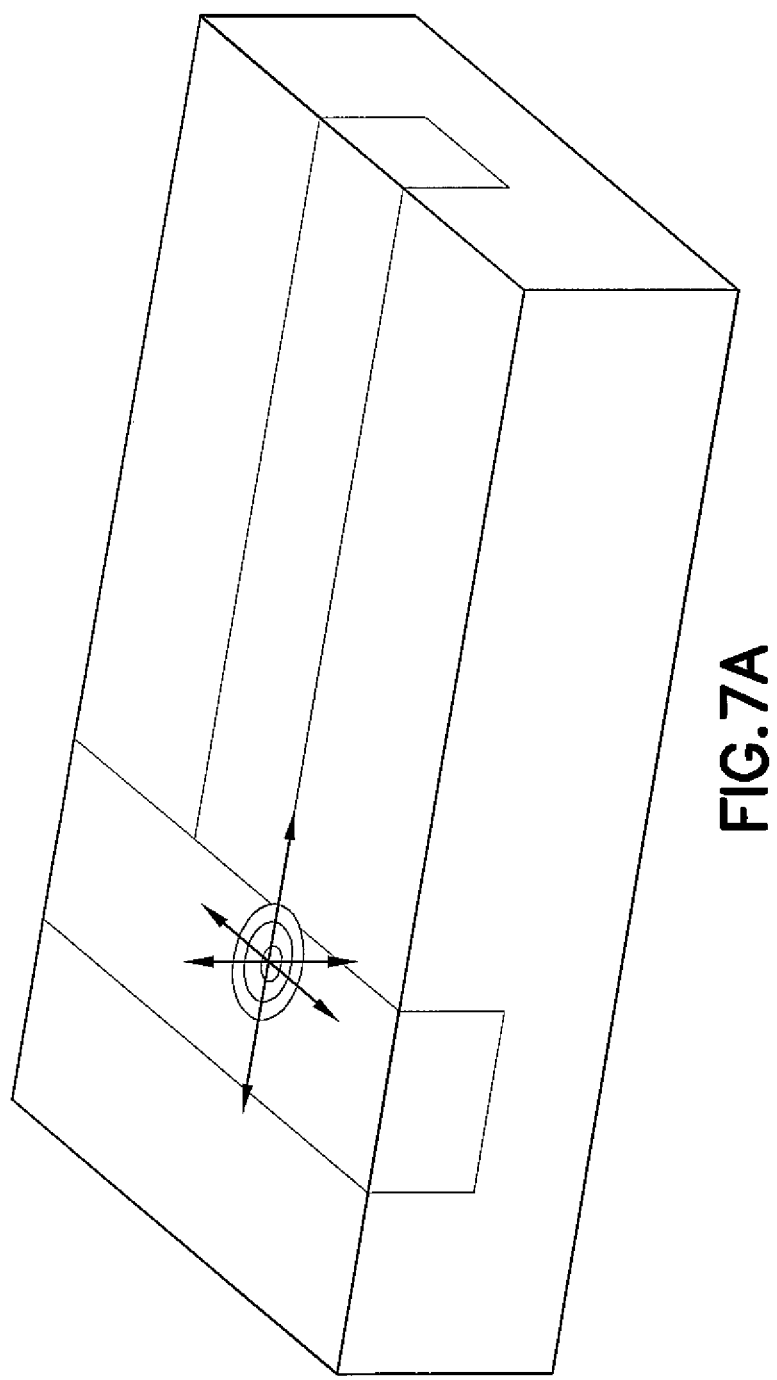
FIG. 7A is a nonlimiting illustration of implementation of optical waveguides.
Figure 7B:
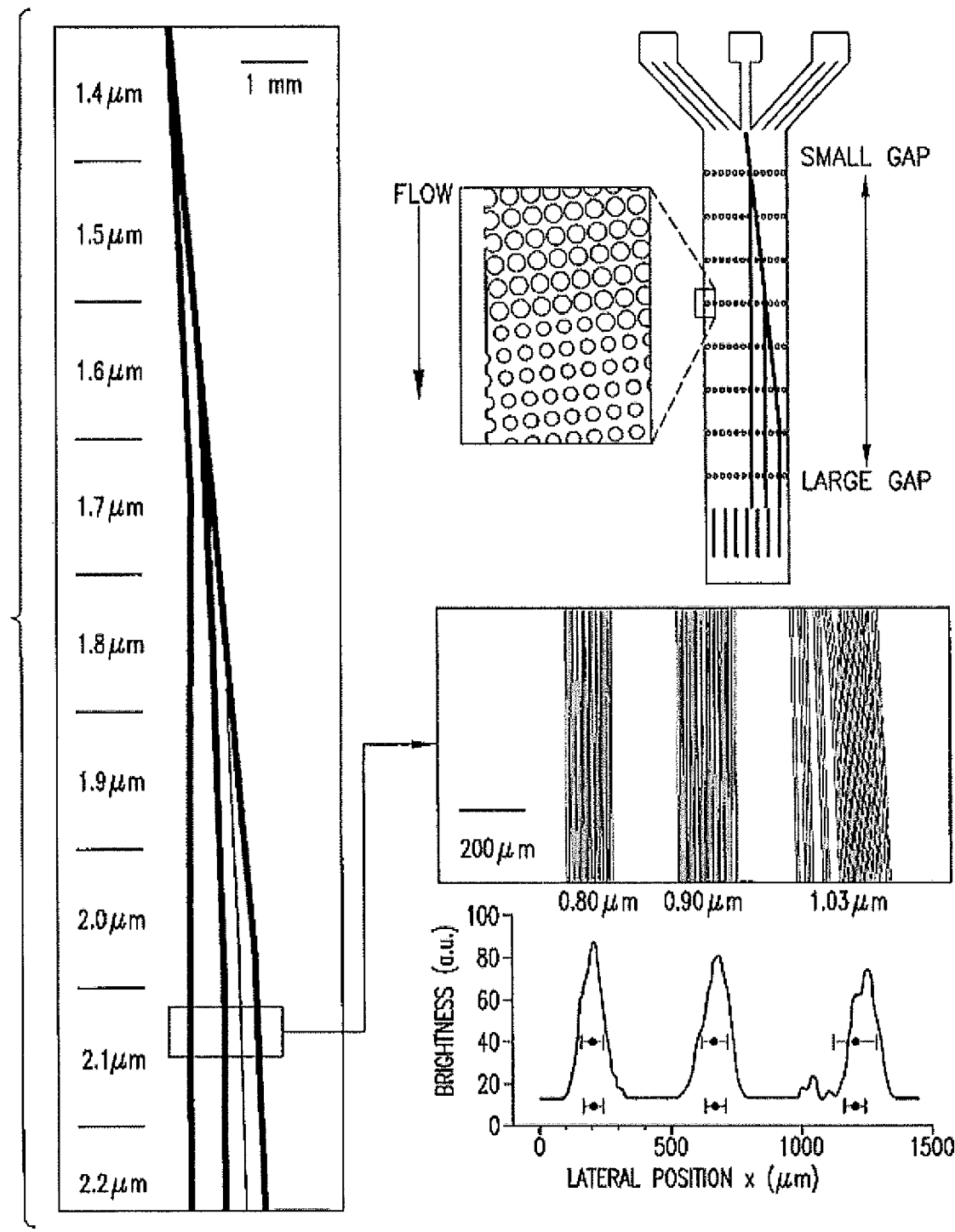
FIG. 7B is a nonlimiting illustration of biomolecules separation after passing pillar array within microfluidic channel.

FIG. 7B shows the movement through the nanopillar array illustrating large gap in a small gap. FIG. 7A is a nonlimiting representation of the fluid channel interacting with the waveguide and showing how the waveguide functions were admitting light can be guided by the waveguide to reach each optical detector.

In the current invention, exemplary embodiments can use particular frequencies of light and the two different waveguides. In such exemplary embodiments, the first waveguide introduces a particular frequency of light. However this frequency of light could be from a laser or even from a simple, cheap LED. This is the incident light or light source that shines on the particles after they pass through the pillars. The second waveguide is the one that captures the light emitted from the molecule of interest.

Therefore, exemplary embodiments of the current invention have a microfluidic sample that has two waveguides at right angles to each other such that when the sample passes through the nanopillars having light introduced by one waveguide and collected by the other, connection to a smart phone would allow for processing of the data to determine whether particular outcome is present. Even if the second waveguide determines that there is the presence of the suspect particles, the determination might not be readily apparent, so a computer computation, such as the processing power of a smart phone or from the cloud can be useful because the signal might not be a clear 1 or 0, for example, some molecules might cluster and emit light with higher intensity. Thus, with smartphone processing power, for example, more accurate information can be derived from the raw signal.

Exemplary embodiments of the current invention could be thought of going through a first stage of sorting through the channels of the nanopillars and a second stage being the detection with the illumination through one waveguide and then interpretation through the other waveguide, where the waveguides at a 90° angle with respect to one another.

Figure 8:
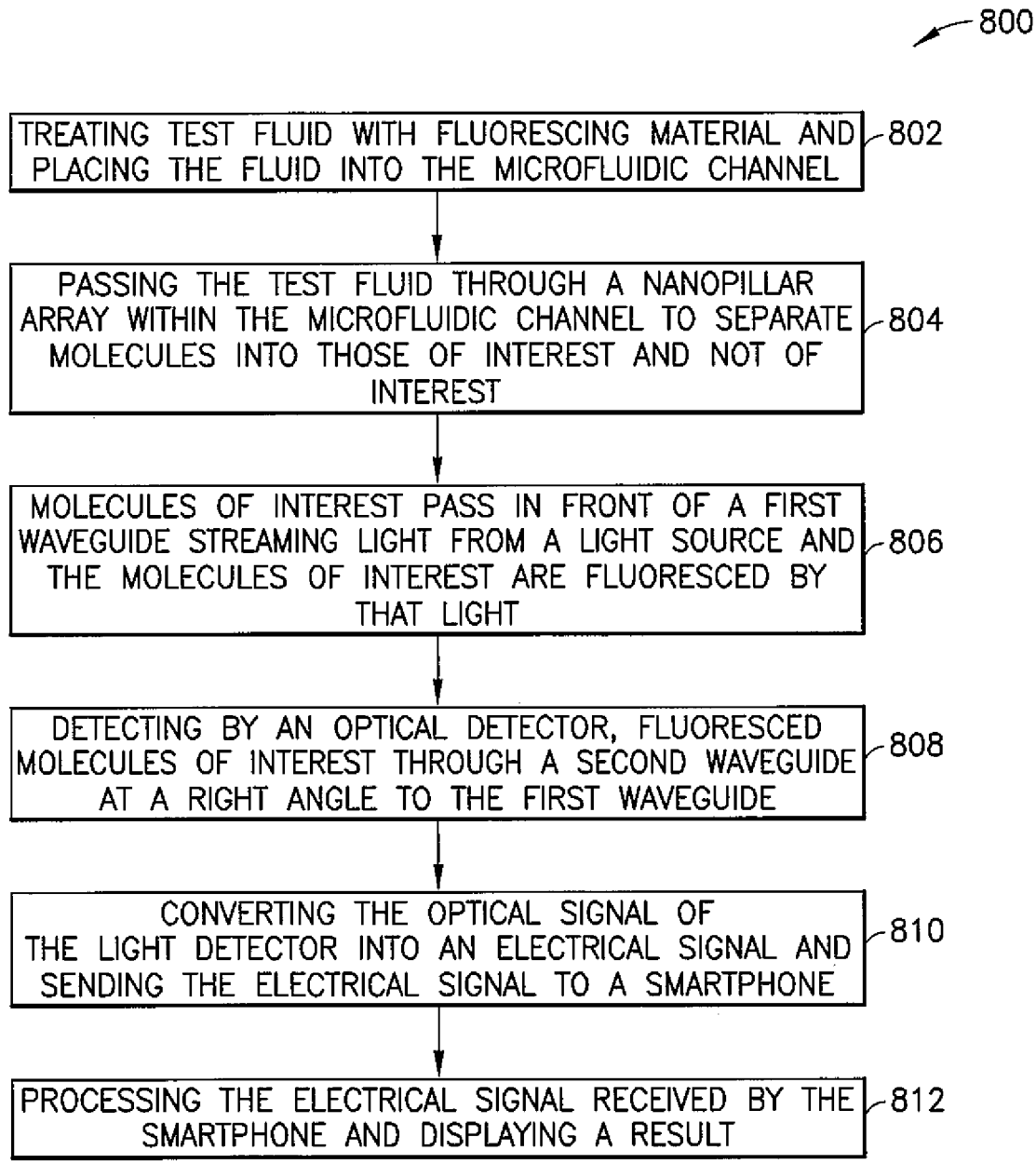
FIG. 8 is a logic flow diagram for sorting the molecules via a nanopillar array within a microfluidic channel, identifying the molecules of interest with an integrated optical component, and connecting to a computer, such as a smartphone, capable of processing the information, where the logic flow diagram illustrates the operation of an exemplary method, which includes execution of computer program instructions embodied on a computer readable memory, functions performed by logic implemented in hardware, and/or interconnected means for performing functions in accordance with exemplary embodiments.

FIG. 8 is a flowchart of an exemplary nonlimiting method to identify particles using a microfluidic channel with micro/nanopillar arrays incorporating a light source and optical detector connected to the microfluidic channel through waveguides at right angles to each other where the resultant data of the optical detector is sent as an electrical signal to a smart phone for processing and display.

The step represented by block 802 is the initial application of a fluid of interest into the opening of the microfluidic channel. Such fluid of interest, as discussed previously, could be blood plasma, some fluidic chemical, some biological molecules in solution, or some other fluid that inquiry to would benefit the process herein described to make a determination as to particles of interest.

In any event, this fluid is deposited into an opening in the chip that is designed to receive a small amount to be processed. Note that prior to the step of placing the fluid into the microfluidic chamber, the fluid would be treated with some compound to fluoresce molecules of interest. Such compound will, under the proper lighting conditions, cause the molecules of interest to fluoresce under the proper lighting conditions.

Prior to the introduction of the sample into the lab on a chip, the sample could be, treated with this fluorescing element/compound. Furthermore, when such tests are conducted, there can be an assumption beforehand that there is a particular molecule being sought. In addition to aid in determining which fluorescing agent would be used, knowing the molecules of interest beforehand could engender varying the distance between the pillars in the micro/nanopillar array. For instance, a virus that is 40 nm to 100 nm in size would be sorted with gaps of 200 nm.

In the pretreatment timeframe, for example, an investigator would look to see if the molecule is larger than size X or smaller than size Y. Thus, for instance, an investigator could search for particular virus of a particular size that is known by the computer. As the sample goes through the nanopillars, it could be thought of as going through an equivalent of a logic gate. Thus, the determination of whether such molecules exist in the sample would yield a yes or no answer.

Block 804 represents the biomolecular fluid passing through a nanopillar array whereby the biomolecular fluid is separated by the size of the molecules into at least two groups where at least one of the plurality of groups is of interest.

The current invention integrates a pillar structure. A benefit of embodiments of the current invention is that the fabrication process of a nanopillar array is similar to the process of fabricating integrated circuits. Mass-producible silicon chips would make the chip low-cost and affordable.

As can be seen from the above, a nanopillar array can separate biomolecules based on the size of those biomolecules.

Regarding the nanopillars, these pillars sort molecules into various channels. The particles could be in the tens of nanometers whereas the distance between the pillars could be in micrometers. Particles, as they are introduced at the top of the pillar structure, will follow different angles depending on the size of the molecules and then will proceed through different branches of the microfluidic channel.

The channel at the end of the nanopillars has the two waveguides, one that shines the light and one that captures the light. The one that shines the light shines in a range of wavelength so that the particles fluoresce being that they were combined with a fluorescence chemical prior to their entering the nanopillar array. Wavelength of this fluorescence can be done by number different ways which is not physically important such as by a laser or even a cheap LED.

Block 806 represents those molecules of interest proceeding down a microfluidic chamber whereby at right angle to the flow a light source shines upon them to activate the fluorescence.

Block 808 represents the molecules of interest that have been fluoresced being detected by a light detector via a waveguide that is at 90° to the waveguide of the light source.

What happens in these exemplary embodiments is that the various molecules fall through the pillar and after they come out there are two waveguides which are at 90° angles to one another. The first waveguide, which sends out the particular frequency of light, will excite the fluorescence which has been added to the sample at the beginning before the sample was put into the microfluidic channel. The second waveguide, which is at right angles to the first, will capture the light emitted from the fluorescent particles falling through. Thus, after the sorting array, the waveguide illuminates and the other waveguide senses the particles.

The second waveguide which captures the light is at a 90° angle to the shining light. Once the particles, or rather their fluorescence, is captured by the second waveguide, then the light is guided by the waveguide to the detector, and then the light signal is converted into an optical signal. This optical signal is then transformed into electrical information. This transformation can be from an analog to digital change or whatever would be compatible between the optical detector and the smart phone, depending on the smart phones processing requirements. Once the optical signal is changed into an electrical signal it can then be transferred to a computer such as one on the smart phone or other portable computer device either by direct wired connection or wirelessly.

Block 810 represents the signal resulting from the light detector being passed to a smart phone or in such sending of the signal from the light detector to the smart phone can be accomplished by hard connection or wirelessly.

Block 812 represents the smart phone processing the received light signal and displaying a result to the user after that signal has been processed either on the smart phone itself for by some other data processing machine that is linked via the smart phone.

Exemplary embodiments of this invention can provide optical sensing using smartphone and a portable chip, enable easy biological test for people by using the signal processing capability of smartphone and internet connection for data uploading for Big data analysis.

The output of this processing would be a count of how many particles there are that were fluoresced. This output would give the information of concentration of the sample. Additionally, the computer to which the data is sent may have previously inputted parameters to compare the outputted concentration of the fluorescent elements. As such, for example if a certain number of fluoresced molecules reveals a particular concentration of biological sample, the computer could determine that a particular disease is present.

Thus, for example, the results can give a determination and amplitude where the determination is whether there is a particular biomarker in the amplitude based on how much light each sample creates. Thus, for instance, a particular concentration may be determined. Since the volume of the samples is known, by counting how much pulse of signal, an estimate the total number of the molecules of interest can be made. Dividing the number by volume, the sample concentration can be deduced. Light amplitude might be useful for correcting the molecular number, for example, two clustered molecules might just give one pulse of light signal, but at higher intensity or duration, then two particles can be counted instead of just one particle.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., 104, 134 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

An example of an embodiment, which can be referred to as item 1, is a method that comprises inputting a fluid into a microchip via a microfluidic channel with a micro/nanopillar array for sorting molecules by size, in response to the fluid passing through the micro/nanopillar array separating the fluid into the particles of interest or particles not of interest or both; lighting the particles of interest by a light source via a first waveguide in the microchip connecting the light source to the microfluidic channel; and detecting lighted particles of interest by an optical detector via a second waveguide in the microchip connecting the optical detector to the microfluidic channel.

An example of a further embodiment, which can be referred to as item 2, is the method of item 1 wherein the first waveguide and the second waveguide are at right angles to one another.

An example of a further embodiment, which can be referred to as item 3, is the method of item 1, wherein the fluid was previously treated with a fluorescing agent, wherein the light source produces a wavelength of light to fluoresce particles treated with a fluorescing agent, and wherein the wavelength of light excites the fluorescing agent fluorescing the particles of interest, and wherein the optical detector detects fluoresced particles in the particles of interest.

An example of a further embodiment, which can be referred to as item 4, is the method of item 1 wherein the light source is an LED or an integrated laser.

An example of a further embodiment, which can be referred to as item 5, is the method of item 1 further comprising converting an optical signal from the optical detector into an electronic signal.

An example of a further embodiment, which can be referred to as item 6, is the method of item 4, further comprising transmitting the electronic signal to a mobile device; processing the electronic signal via use of a mobile device; and outputting an evaluation of the electronic signal via a display of the mobile device.

An example of a further embodiment, which can be referred to as item 7, is the method of item 6, further comprising linking the mobile device to a further computing device for further processing.

An example of a further embodiment, which can be referred to as item 8, is the method of item 7, wherein the further computing device is in the cloud.

An example of a further embodiment, which can be referred to as item 9, is the method of item 1, wherein the light source and the optical detector are powered by a mobile device.

An example of a further embodiment, which can be referred to as item 10, is the method of item 1, wherein the micro/nanopillar array or a plurality of micro/nanopillar arrays can separate the fluid into a proposed plurality of particles of interest, wherein a plurality of first and second waveguides and a plurality of light sources and optical detectors corresponds to the plurality of proposed particles of interest.

An example of another embodiment of the present invention, which can be referred to as item 11, is an apparatus which comprises a microchip comprising at least one microfluidic channel with at least one micro/nanopillar array for sorting molecules by size, wherein a fluid input into the at least one microfluidic channel can be separated into at least one group of particles of interest or at least one group of particles not of interest, or both at least one group of particles of interest and at least one group of particles not of interest; at least one light source for lighting the at least one group of particles of interest via at least one first waveguide in the microchip connecting the at least one light source to the at least one microfluidic channel; and at least one optical detector for detecting lighted at least one group of particles of interest via at least one second waveguide in the microchip connecting the at least one optical detector to the at least one microfluidic channel. This other embodiment of the present invention, may also have the apparatus comprising at least one processor and at least one memory including computer program code, wherein the at least one memory and the computer code are configured, with the at least one processor, to cause the apparatus to at least perform at least some of the functions described above.

An example of a further embodiment, which can be referred to as item 12, is the method of item 11, wherein the at least one first waveguide and the at least one second waveguide are at right angles to one another.

An example of a further embodiment, which can be referred to as item 13, is the method of item 11, wherein the fluid was previously treated with a fluorescing agent, wherein the at least one light source produces at least one wavelength of light to fluoresce particles treated with at least one fluorescing agent, wherein the at least one wavelength of light excites the at least one fluorescing agent fluorescing the at least one group of particles of interest, and wherein the at least one optical detector detects fluoresced particles in the at least one group of particles of interest.

An example of a further embodiment, which can be referred to as item 14, is the method of item 11, further comprising at least one power source to power the at least one light source and the at least one optical detector.

An example of a further embodiment, which can be referred to as item 15, is the method of item 11, further comprising at least one connection to a device serving as at least one power source to power the at least one light source and the at least one optical detector.

An example of a further embodiment, which can be referred to as item 16, is the method of item 11, wherein the at least one light source is an LED or an integrated laser.

An example of a further embodiment, which can be referred to as item 17, is the method of item 11, further comprising at least one converter for converting at least one optical signal from the at least one optical detector into at least one electronic signal.

An example of a further embodiment, which can be referred to as item 18, is the method of item 17, further comprising at least one transmitter for transmitting the at least one electronic signal to at least one mobile device for further processing.

An example of a further embodiment, which can be referred to as item 19, is the method of item 11 connectable to at least one mobile device, where such mobile device can include but is not limited to a smart phone, other types of cellular telephones, tablets, personal digital assistants (PDAs) having wireless communication capabilities, portable computers having wireless communication capabilities, image capture devices such as digital cameras having wireless communication capabilities, wrist-worn smart watches, portable medical or scientific devices, handheld medical or scientific devices, gaming devices having wireless communication capabilities, music storage and playback appliances having wireless communication capabilities, Internet appliances permitting wireless Internet access and browsing, tablets with wireless communication capabilities, simple or complex portable or stationary devices that can connect to the cloud, as well as portable units or terminals that incorporate combinations of such functions.

In another example of an embodiment of the current invention, which can be referred to item 20, a computer program product embodied on a non-transitory computer-readable medium in which a computer program is stored that, when being executed by a computer, would be configured to provide instructions to control or carry out analyzing an electronic signal from a microchip configured to produce an electronic signal from an optical signal wherein that optical signal is a result of detecting lighted particles of interest by an optical detector via a second waveguide in the microchip connecting the optical detector to a microfluidic channel in the microchip after particles of interest were lighted by a light source via a first waveguide in the microchip connecting the light source to the microfluidic channel, as a result of fluid inputted into a microchip via a microfluidic channel with a micro/nanopillar array for sorting molecules by size, wherein in response to the fluid passing through the micro/nanopillar array, the fluid separates into the particles of interest or particles not of interest or both.

It is also noted herein that while the above describes examples of embodiments of the invention, these descriptions should not be viewed in a limiting sense. Rather, there are several variations and modifications which may be made without departing from the scope of the present invention as defined in the appended claims.

What is claimed is:

1. A method comprising:
   inputting a fluid into a microchip via a microfluidic channel with a micro/nanopillar array for sorting particles by size;
   in response to the fluid passing through the micro/nanopillar array, separating the fluid into a first branch of the microfluidic channel for particles of interest and a second branch of the microfluidic channel for particles not of interest;
   lighting the particles of interest by an on-chip light source via a first waveguide in the microchip connecting the on-chip light source to the first branch of the microfluidic channel; and
   detecting the lighted particles of interest by an optical detector via a second waveguide in the microchip connecting the optical detector to the first branch of the microfluidic channel, wherein the first waveguide and the second waveguide are substantially orthogonal;
   wherein the first waveguide has a width that spans a length of the first waveguide, and the width of the first waveguide is substantially similar to a width of the first branch of the microfluidic channel;
   wherein the second waveguide has a width that spans a length of the second waveguide, and the width of the second waveguide is substantially similar to a width of an entering channel of the first branch of the microfluidic channel;
   wherein the first waveguide and the second waveguide are substantially adjacent where the first waveguide and the second waveguide are orthogonal and the particles of interest transition from the entering channel of the first branch of the microfluidic channel to a reservoir portion of the first branch of the microfluidic channel.

2. The method of claim 1, further comprising:
treating the fluid with a fluorescing agent prior to inputting the fluid into the microchip,
producing, by the on-chip light source, a wavelength of light to fluoresce particles treated with the fluorescing agent by exciting the fluorescing agent with the wavelength of light, and
detecting, by the optical detector, the fluoresced particles in the particles of interest.

3. The method of claim 1, further comprising:
converting an optical signal from the optical detector into an electronic signal;
transmitting the electronic signal to a mobile device;
processing the electronic signal; and
outputting an evaluation of the electronic signal via a display of the mobile device.

4. The method of claim 3, wherein the processing of the electronic signal is performed via use of one or more processors of a remote cloud computing platform external to the mobile device.

5. The method of claim 3, further comprising:
linking the mobile device to a further computing device for further processing.

6. The method of claim 5, wherein the further computing device is in the cloud.

7. The method of claim 1, wherein the on-chip light source and the optical detector are powered by a mobile device.

8. The method of claim 1, wherein the micro/nanopillar array or a plurality of micro/nanopillar arrays can separate the fluid into a proposed plurality of particles of interest, wherein a plurality of first and second waveguides and a plurality of light sources and optical detectors corresponds to the plurality of proposed particles of interest.

9. The method of claim 1, further comprising selecting a distance between adjacent pillars of the micro/nanopillar array depending on a size of particles of interest to be detected.

10. The method of claim 1, further comprising:
producing an optical signal from fluorescence light via optical sensing elements of the optical detector, wherein the optical signal provides information about the detection of the particles of interest;
transforming the optical signal into an electronic signal; and
wirelessly transmitting the electronic signal from the optical detector to a smartphone to analyze a result of the sorting.

11. The method of claim 1, wherein the microchip is formed of silicon, and further comprising fabricating the microchip using a commonly used process used for fabricating an integrated circuit.

12. The method of claim 1, wherein the first branch of the microfluidic channel for the particles of interest and the second branch of the microfluidic channel for the particles not of interest are created via a plane structure that divides the first branch and the second branch.

13. An apparatus comprising a microchip, comprising:
at least one microfluidic channel with at least one micro/nanopillar array for sorting of particles by size, wherein a fluid input into the at least one microfluidic channel can be separated based on the sorting into at least a first branch of the microfluidic channel for at least one group of particles of interest and at least a second branch of the microfluidic channel for at least one group of particles not of interest;
at least one on-chip light source for lighting the at least one group of particles of interest via at least one first waveguide in the microchip connecting the at least one on-chip light source to the at least one first branch of the microfluidic channel; and
at least one optical detector for detecting the lighted at least one group of particles of interest via at least one second waveguide in the microchip connecting the at least one optical detector to the at least one first branch of the microfluidic channel, wherein the at least one first waveguide and the at least one second waveguide are substantially orthogonal;
wherein the first waveguide has a width that spans a length of the first waveguide, and the width of the first waveguide is substantially similar to a width of the first branch of the microfluidic channel;
wherein the second waveguide has a width that spans a length of the second waveguide, and the width of the second waveguide is substantially similar to a width of an entering channel of the first branch of the microfluidic channel;
wherein the first waveguide and the second waveguide are substantially adjacent where the first waveguide and the second waveguide are orthogonal and the particles of interest transition from the entering channel of the first branch of the microfluidic channel to a reservoir portion of the first branch of the microfluidic channel.

14. The apparatus of claim 13,
wherein the fluid was previously treated with at least one fluorescing agent,
wherein the at least one light source produces at least one wavelength of light to fluoresce particles treated with the at least one fluorescing agent,
wherein the at least one wavelength of light excites the at least one fluorescing agent fluorescing the at least one group of particles of interest, and
wherein the at least one optical detector detects fluoresced particles in the at least one group of particles of interest.

15. The apparatus of claim 13, further comprising:
at least one power source to power the at least one light source and the at least one optical detector.

16. The apparatus of claim 13, further comprising:
at least one connection to a device serving as at least one power source to power the at least one light source and the at least one optical detector.

17. The apparatus of claim 16, wherein the at least one connection to the device serving as at least one power source to power the at least one light source and the at least one optical detector shares a medium with another connection configured to transmit at least one electronic signal to the device for further processing, the electrical signal having information about the detecting of the lighted at least one group of particles of interest.

18. The apparatus of claim 17, wherein the medium is a wireless medium, and the device is a mobile device.

19. The apparatus of claim 13, further comprising:
at least one converter for converting at least one optical signal from the at least one optical detector into at least one electronic signal.

20. The apparatus of claim 19, further comprising:
at least one transmitter for transmitting the at least one electronic signal to at least one mobile device for further processing.

21. The apparatus of claim 13 connectable to at least one mobile device.

22. The apparatus of claim 13, further comprising at least one wireless connection to a device serving as at least one power source to power the at least one light source and the at least one optical detector via the wireless connection.

23. A computer program product implemented in combination with an apparatus comprising a microchip, the computer program product embodied on a non-transitory computer-readable medium in which a computer program is stored that, when being executed by a computer, is configured to provide instructions to control or carry out operations, wherein the apparatus comprising the microchip comprises:
- at least one microfluidic channel with at least one micro/nanopillar array for sorting of particles by size, wherein a fluid input into the at least one microfluidic channel can be separated based on the sorting into at least a first branch of the microfluidic channel for at least one group of particles of interest and at least a second branch of the microfluidic channel for at least one group of particles not of interest;
- at least one on-chip light source for lighting the at least one group of particles of interest via at least one first waveguide in the microchip connecting the at least one on-chip light source to the at least one first branch of the microfluidic channel; and
- at least one optical detector for detecting the lighted at least one group of particles of interest via at least one second waveguide in the microchip connecting the at least one optical detector to the at least one first branch of the microfluidic channel, wherein the at least one first waveguide and the at least one second waveguide are substantially orthogonal;
- wherein the first waveguide has a width that spans a length of the first waveguide, and the width of the first waveguide is substantially similar to a width of the first branch of the microfluidic channel;
- wherein the second waveguide has a width that spans a length of the second waveguide, and the width of the second waveguide is substantially similar to a width of an entering channel of the first branch of the microfluidic channel;
- wherein the first waveguide and the second waveguide are substantially adjacent where the first waveguide and the second waveguide are orthogonal and the particles of interest transition from the entering channel of the first branch of the microfluidic channel to a reservoir portion of the first branch of the microfluidic channel;
- wherein the operations of the computer program product comprise:
  - causing providing of excitation light from the at least one on-chip light source of the microchip to induce fluorescence light in the at least one group particles of interest via the first waveguide,
  - causing detecting of the fluorescence light at the at least one optical detector via the second waveguide,
  - causing production of an optical signal from the fluorescence light via optical sensing elements of the optical detector, the optical signal having information about the detection of the at least one group of particles of interest,
  - causing transforming of the optical signal into an electronic signal, and
  - causing outputting of the electronic signal for analysis from the microchip.

* * * * *